United States Patent Office

PTO - BOYERS, PA Duty Station

MISSING PAGE TEMPORARY NOTICE

PATENT # Re 3646 FOR ISSUE DATE 9-21-1869

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

dwgs

Data Conversion Operation

Boyers, Pa

BEST AVAILABLE COPY

UNITED STATES PATENT OFFICE.

D. A. KENNEDY, WILLIAM WADSWORTH, AND E. D. MURRAY, OF DARIEN, WISCONSIN, ASSIGNEES OF D. A. KENNEDY.

ROTARY OVEN.

Specification forming part of Letters Patent No. 52,240, dated July 20, 1866; Reissue No. 3,616, dated September 21, 1869

*To all whom it may concern:*

Be it known that D. A. KENNEDY, of Darien, in the county of Walworth and State of Wisconsin, did invent a new and Improved Rotary Oven; and we do hereby declare that the following is a full, clear, and exact description thereof, which will enable others skilled in the art to make and use the same, reference being had to the accompanying drawings, forming part of this specification, in which—

Figure 1 is a vertical section of this improved oven, taken in the line *y y*, Fig. 2. Fig. 2 is a longitudinal section of the same, taken through the line *x x*, Fig. 1, part of the rotating platform being broken away to show the position of the fire-chambers and flues.

Similar letters of reference indicate corresponding parts in the several figures of the drawings.

This invention relates to rotary ovens, and has for its object, principally, to distribute the heat equally throughout the entire oven, both above and below the rotary plate or table, thus insuring all the parts being evenly heated.

It has further for its object to reduce the friction upon the central bearing of the rotary table, to form a support for its outer edge, and to improve the construction of the table itself.

With these objects in view the invention consists, first, in such an arrangement of the fire-chambers and flues that the heat and products of combustion are directed along the under surface of the table and through a central opening therein to the top of the oven in such a manner that the heat is distributed equally throughout the entire oven, both above and below the table.

It consists, secondly, in the combinaton of the rotary table with the central stationary shaft, with two collars affixed, one to the stationary shaft and the other to the central portion of the table, and with a series of friction-balls which are placed between the collars and serve to reduce the friction as the table is rotated.

It consists, thirdly, in the combination of friction wheels or rollers with the rotary table, and with a track formed around the inner circumference of the oven-wall, whereby the outer edge of the table is supported and its friction reduced during rotation.

It consists, finally, in the peculiar construction of the table itself, whereby the same is made light and strong, so that it can be operated by suitable means, and at the same time resist the action of heat and sustain the requisite weight.

In the accompanying drawings, A is the wall of the oven, composed of brick or other suitable material, and made circular in form.

The wall A is made with a shoulder or offset, *a'*, at a suitable distance below its top, as shown in Fig. 1. The shoulder *a'* may be plated with metal to form a smooth track for the wheels B, and thus diminish friction. Instead of forming the shoulder or offset, a circular plate of iron may be supported upon brackets around the inner circumference of the wall at the proper height to form the track for the wheels B.

C is a vertical shaft, firmly secured in place in the center of the oven, as shown in the drawings. To the shaft C, a little below the horizontal plane of the shoulder *a'*, is firmly attached a collar, D, having a circular groove upon its inner side or face.

E is a collar placed and revolving loosely upon the shaft C, and which has a circular groove formed in its lower side, corresponding in form and position with the groove in the stationary collar D. If desired, the groove in the collar E may be dispensed with.

F are balls placed between the collars D and E to diminish the friction caused by the revolution of the collar E. The upper side of the collar E is grooved or channeled radially to receive the inner ends of the radial arms G, which extend out to the shoulder *a'*, and have journals formed upon their outer ends to receive the friction-wheels B, which roll along the said shoulder or track *a'*. The outer ends of the radial arms G are kept in their proper relative positions by being attached to a ring, rim, or band, H, as shown in Figs. 1 and 2.

AVAILABLE COPY

The rim may be dispensed with and the arms held in position by braces arranged between them.

If preferred, the rollers B may, by means of short axles, be connected to the rim H, instead of to the ends of the arms G.

I is the oven plate or bottom, which is made in sections, as shown in Fig. 2, and is securely attached to the arms G, so as to be carried around with them, thereby forming a rotary bottom or table. Holes may be formed in the plate I, near its outer edge, to receive an iron hook or handle for revolving [illegible] section when desired. The middle part of the plate I is cut away, as shown in Figs. 1 and 2, to allow the heat to circulate freely through the upper part of the oven.

J is the arched roof of the oven, which rests upon the radial rafters K, the outer ends of which are supported by the wall A, and the inner ends of which are connected with the collar L, placed upon and supported by the central vertical shaft C, as shown in Fig. 1. This construction allows the arched roof to be made flatter than is possible when the arch is made wholly self-supporting.

M are the fire-chambers, N are the grates, and O are the ash-pits. The fire-chambers are joined together at their outer ends, where they enter the oven-wall, and diverge inwardly to about the center of the oven, where they are joined by the inner ends of two flues, P, whose outer ends converge toward the back of the oven, as clearly shown in Fig. 2. Two other flues, P, are placed upon the proximate sides of the fire-chambers M, terminating beneath the central opening in the rotary table, and extending upward a short distance above the upper surface of said fire-chambers. Openings may be arranged along the outer sides of the fire-chambers to permit the escape of products of combustion into the oven, if found desirable or necessary. The two central flues P direct the products of combustion through the central opening in the table I to the upper portion of the oven above the table, and as they impinge against the roof the heat is radiated therefrom to the upper surface of the rotary table. By carrying the discharge-openings of the central flues slightly above the upper surface of the fire-chambers the draft through them is somewhat increased, and consequently the heat is directed first to the upper portion of the oven, so that such portion may become heated equally with the lower portion, which latter receives its heat from the converging flues, and also from the sides of the fire-chambers by radiation. By this arrangement the heat is distributed equally throughout all parts of the oven, thus insuring its being heated evenly.

Q is the chimney-flue, the draft through which is regulated or entirely stopped, as the [illegible] damper R, to which is attached a rod, S, passing out at the front of the oven for convenience in operating the said damper.

The ash-pits O, fire-chambers M, and oven-opening *a'* are all provided with doors T, which slide in grooves in the iron frames U, laid in the wall A of the oven.

Having thus described the invention, what we claim as new, and desire to secure by Letters Patent, is—

1. The fire-chambers M and flues P of a rotary oven, arranged, as described, or in any equivalent manner, to discharge the heat and products of combustion equally throughout the oven, both above and below the rotary table, substantially as herein set forth, for the purpose specified.

2. The combination of the rotary table or oven-bottom with the stationary vertical shaft C, rotary collar E, fixed collar D, and friction-balls F, substantially as herein shown and described, for the purpose specified.

3. The friction wheels or rollers B, in combination with the rotary oven-table and the track *a'*, substantially as herein shown and described, for the purpose specified.

4. The rotary table, constructed, substantially as described, of the collar E, radial arms G, rollers B, and sectional plates I, and either with or without the rim H, for the purpose specified.

The above specification signed by us this 16th day of August, 1869.

D. A. KENNEDY.
WM. WADSWORTH.
E. D. MURRAY.

Witnesses:
A. M. TANNER.
C. A. PETTIT.